United States Patent

Bartholomew

[15] 3,661,545

[45] May 9, 1972

[54] METHOD FOR TREATING A MOLTEN SALT WITH WATER VAPOR

[72] Inventor: Roger F. Bartholomew, Corning, N.Y.
[73] Assignee: Corning Glass Works, Corning, N.Y.
[22] Filed: Nov. 19, 1969
[21] Appl. No.: 878,225

[52] U.S. Cl. ..................................65/30, 65/32, 65/134, 65/99, 65/182, 65/116
[51] Int. Cl. .................................C03c 15/00, C03b 18/00
[58] Field of Search..................65/30, 116, 32, 134, 99, 182

[56] References Cited

UNITED STATES PATENTS

| | | | |
|---|---|---|---|
| 3,317,297 | 5/1967 | Ray | 65/30 |
| 3,395,999 | 8/1968 | Lewek | 65/30 |
| 3,477,834 | 11/1969 | Morris | 65/30 |
| 3,556,757 | 1/1971 | Kozlowski et al. | 65/30 X |
| 2,263,489 | 11/1941 | Day | 65/116 |
| 3,259,517 | 7/1966 | Atwell | 65/30 X |
| 3,375,155 | 3/1968 | Adams | 65/30 X |
| 3,529,946 | 9/1970 | Fischer et al. | 65/116 X |

*Primary Examiner*—Frank W. Miga
*Attorney*—Clarence R. Patty, Jr. and Clinton S. Janes, Jr.

[57] ABSTRACT

This invention relates to the strengthening of alkali metal silicate glass articles through an ion exchange reaction employing a bath of molten alkali metal salt as the source of exchanging ions. More specifically, this invention relates to a means for typing up calcium ions present in the bath of molten salt, which deleteriously affect the strengthening capability of the bath, by passing water vapor through the molten salt.

5 Claims, No Drawings

METHOD FOR TREATING A MOLTEN SALT WITH WATER VAPOR

In the past, baths of molten salts have been utilized in treating glass articles for various purposes such as staining, surface coating, thermal tempering, and, more recently, chemical strengthening. This latter process contemplates two fundamentally different techniques but both techniques rely upon the same basic mechanism, viz., the exchange of ions occurring between a molten salt and the surface of the glass article. The instant invention was designed to alleviate certain problems which had been encountered in these chemical strengthening techniques but, while having special utility for these purposes, should not be so restricted.

The first method of ion exchange strengthening, exemplified by U.S. Pat. No. 2,779,136, comprises exposing a sodium and/or potassium silicate glass article to a bath of a molten lithium salt operating at a temperature above the strain point of the glass for a sufficient length of time to cause the replacement of sodium and/or potassium ions with lithium ions in the surface of the article. Inasmuch as this exchange is undertaken at temperatures above the strain point of the glass, viscous flow and molecular rearrangement can occur in the surface of the glass so, in reality, a new glass composition is formed in the surface layer. This lithium-containing glass has a lower coefficient of thermal expansion than the parent sodium and/or potassium glass such that when the article is cooled to room temperature a surface compression layer is developed within the surface of the article. The so-developed compression layer imparts greatly enhanced mechanical strength to the article.

In the second method of ion exchange strengthening, typified by British Pat. No. 917,388, comprises exposing an alkali metal silicate glass article to a bath of molten salt of a monovalent metal having a larger ionic diameter than that of the alkali metal present in the glass, operating at a temperature below the strain point of the glass, for a sufficient length of time to cause replacement of the alkali metal ions in the surface of the glass with the larger monovalent metal ions. Since this exchange is carried out at temperatures below the strain point of the glass, viscous flow therein cannot take place such that the larger monovalent metal ions are crowded into sites within a surface layer of the glass previously occupied by the small alkali metal ions. This crowding of the larger ions into the small ion sites sets up compressive stresses in a surface layer within the article which, in turn, increase the mechanical strength of the article.

British Pat. No. 966,733 relates to a specific improvement upon said British Pat. No. 917,388, viz., the unexpected utility of alkali metal aluminosilicate glasses in this ion exchange strengthening practice. Hence, laboratory experimentation had demonstrated that, although many glass compositions could be initially strengthened by this large-ion-for-small-ion type exchange, the improvement in strength imparted to such articles was essentially lost after minor abrasion of the surface thereof. And, inasmuch as substantially all applications for glass products contemplate some measure of surface abuse, even if only that commonly encountered in normal handling and shipping, the enhancement in strength provided by the ion exchange treatment was too ephemeral to be useful.

However, as is pointed out in British Pat. No. 966,733, glasses consisting essentially, by weight on the oxide basis, of about 5–25 percent alkali metal oxide, 5–25 percent $Al_2O_3$, and the remainder $SiO_2$, exhibit a great improvement in strength when exposed to the large-ion-for-small-ion type exchange and this increase is essentially maintained even after substantial surface abrasion. Therefore, the alkali metal aluminosilicate glasses are stated to demonstrate excellent "abraded strength," i.e., a permanent or practical strength, whereas other glass compositions, e.g., the common soda-lime-silica glasses of commerce, do not. This situation has resulted in all the presently marketed glass articles which have been ion exchange strengthened being made from compositions in that field.

The presence of impurities in the bath of molten salt can result in crazing, etching, and other kinds of surface attack on the glass or can cause the bath to become non-strengthening, i.e., a surface compression layer is not formed on the glass article such that essentially no improvement in mechanical strength is felt. Extensive investigation has demonstrated that one of the major causes of the failure of monovalent metal salt baths to strengthen alkali metal silicate glass articles is the presence of alkaline earth metal ions in the bath. Hence, amounts greater than about 1 percent by weight of calcium ions in the molten salt can exchange with an alkali metal cation in the glass surface, thereby blocking any further ion exchange. The other alkaline earth metals, i.e., strontium and barium, are much larger and less mobile such that exchange therewith is substantially negligible. These calcium ions appear in the bath of molten salt as unwanted impurities in the salt, itself, and/or as a result of the ion exchange reaction wherein calcium ions from the glass surface diffuse out into the bath.

U.S. Pat. No. 3,395,999, assigned to the same assignee as the present application, discloses the addition of diatomaceous earth to monovalent metal salt baths to minimize chemical attack of the glass surface and to convert a non-strengthening bath to a strengthening bath. That invention relied upon the extensive surface area offered by the diatomaceous earth for reaction with impurities in the bath. However, although effective in reducing chemical attack by the bath on the glass surface and maintaining the strengthening capability of the bath, three disadvantages were observed then practicing that invention: (1) the presence of diatomaceous earth in the bath increased the viscosity thereof such as to impede easy handling of the glass and increasing the time required for removing the salt clinging to the glass articles when lifted out of the bath; (2) continued additions of diatomaceous earth to the bath to maintain the strengthening capability thereof produced a salt bath mixture too viscous for convenient handling of the articles; and (3) the diatomaceous material settled to the bottom of the bath tank causing the burning out of the heating elements placed therein.

Because of these problems, another solution for removing impurities from the bath was sought. I have discovered that calcium ions in a salt bath can be tied up in such a way by passing water vapor through the molten salt. Hence, by passing water vapor through the molten salt, the species $Ca(H_2O)_n^{2+}$, wherein $n = 1-4$, can be produced in the melt. Inasmuch as these hydrated ions are very large in size, they are incapable of exchanging with the alkali metal ions in the glass surface and, therefore, their presence in the molten salt is rendered innocuous. Yet, since the $Ca(H_2O)_n^{2+}$ species remain in solution, the three problems encountered with diatomaceous earth recited above are absent in my invention.

Whereas the passing of water vapor through baths of molten chloride, sulfate, and other high melting salts which are useful in practicing the inventions of U.S. Pat. No. 2,779,136 and British Pat. Nos. 917,388 and 966,733 is unquestionably beneficial, the principal commercial glass strengthening processes involving ion exchange utilize nitrate baths operating at temperatures below about 600° C. and, consequently, the following specific examples of my invention are directed thereto. Hence, commercial glass strengthening by ion exchange of the large-ion-for-small-ion type has customarily employed a nitrate bath wherein large monovalent ions replace smaller alkali metal ions in the surface of the glass at temperatures below the strain point of the glass. Therefore, the examples described below particularly refer to glasses and baths of molten salts utilized in that type of chemical strengthening practice.

Glass cane samples about 4 in. × ¼ diameter to be broken for modulus of rupture measurements were formed from a composition, expressed in weight percent on the oxide basis, of approximately 61.4% $SiO_2$, 16.8% $Al_2O_3$, 12.7% $Na_2O$, 3.6% $K_2O$, 3.6% $MgO$, 1.0% $As_2O_3$, 0.2% $CaO$, and 0.7% $TiO_2$. The glass batch may consist of any ingredients, either the oxides or other compounds, which, on being melted together, will be converted to the desired oxide composition in the proper proportions. This glass is especially suitable for strengthening by means of a bath of molten potassium salt such that K$^+$ ions are exchanged for Na$^+$ ions.

This glass composition comes within the purview of British Pat. No. 966,733 and specific reference is made thereto for other alkali metal aluminosilicate glasses which are suitable for use in this invention.

The following table reports the results of the invention. Thus, a fresh bath of molten Baker's reagent grade potassium nitrate, KNO$_3$, was prepared and cane samples of the above glass immersed therein at 525° C. for the times noted. The cans samples were then removed from the bath, the clinging salt washed off with tap water, and modulus of rupture values measured in the conventional manner on each. The figure recorded in the table represents an average value for five cane samples.

Thereafter, about 0.22 percent, 0.5 percent, and 1 percent by weight of calcium nitrate, Ca(NO$_3$)$_2$, were admixed to the bath of molten KNO$_3$ to simulate contamination of the bath with Ca$^{2+}$ ions leached out of the glass and/or present as impurities in the KNO$_3$ constituting the bath. Cane samples were immersed into this so-contaminated bath at 525° C. for the times noted. The samples were then withdrawn from the bath, washed in tap water, and modulus of rupture values determined thereon.

Finally, nitrogen, passed through a flask of water at a rate to yield 1 liter of water vapor per hour, was bubbled through the contaminated salt bath for the times reported. Cane samples were then immersed into the bath at 525° C. for the times noted, the samples thereafter removed from the bath, cleaned of salt in tap water, and modulus of rupture values measured thereon.

TABLE

| Salt Bath | Immersion Time | Modulus of Rupture |
|---|---|---|
| KNO$_3$ | 8 hours | 61,200 psi |
| KNO$_3$ + 0.22% Ca(NO$_3$)$_2$ | 8 hours | 36,100 psi |
| KNO$_3$ + 0.5% Ca(NO$_3$)$_2$ | 8 hours | 33,100 psi |
| KNO$_3$ + 1.0% Ca(NO$_3$)$_2$ | 8 hours | 8,480 psi |
| KNO$_3$ + 0.22% Ca(NO$_3$)$_2$ + 1 l./hr. water vapor for 16 hours | 8 hours | 58,300 psi |
| KNO$_3$ + 0.5% Ca(NO$_3$)$_2$ + 1 l./hr. water vapor for 16 hours | 8 hours | 66,700 psi |
| KNO$_3$ + 1.0% Ca(NO$_3$)$_2$ + 1 l./hr. water vapor for 16 hours | 8 hours | 7,900 psi |

The effectiveness of passing water vapor through the bath of molten KNO$_3$ in restoring the strengthening capability thereof which had been seriously depressed through the presence of Ca$^{2+}$ ion contamination is believed to be dramatically demonstrated in this table. Furthermore, the table ably illustrates the criticality of maintaining the contamination of the bath with Ca$^{2+}$ ions below a maximum of about 1 percent by weight. Hence, even very extended periods of bubbling water vapor through baths containing more than about 1 percent Ca$^{2+}$ ion contamination will not yield an article having a mechanical strength approaching that obtainable from an essentially Ca$^{2+}$ ion-free bath.

Although the examples reported in the table were founded upon the use of a highly contaminated bath, it will be appreciated that, rather than waiting until the bath of molten salt has lost much of its strengthening capability (as was simulated in the above tests) and then beginning the water vapor treatment thereof, short periods of vapor flow at empirically determined spaced intervals could be utilized or essentially continuous flow at low water volume would likewise be effective. Also, whereas nitrogen was employed in the preceding examples as the carrier gas because of its relative cheapness, other inert gases such as helium and argon may be substituted therefore or water vapor alone may be bubbled through the melt. However, the quantity of water vapor introduced, the ease with which the water vapor can be dispersed in the bath, and the safety factor inherent in bubbling water vapor in diluted form into the bath rather than by itself has recommended the use of an inert carrier or diluent gas. Nevertheless, that it is the water vapor which is effective in tying up the Ca$^{2+}$ ions to restore the strengthening potential of a Ca$^{2+}$ ion contaminated bath rather than the inert diluents, has been experimentally confirmed.

Finally, the rate at which the water vapor is passed into the bath is only important in that the quantity of vapor is adequate to restore and/or maintain the Ca$^{2+}$ ion concentration below 1 percent. Obviously, excessive amounts merely increase production costs and excessive flow rates will cause unnecessary turbulence in the bath.

In any event, it is firmly believed that each of these process factors can be readily determined empirically and, therefore, is well within the technical competence of a person of ordinary skill in the art.

I claim:

1. In a method for continuously strengthening an alkali metal silicate glass article by immersing said article in a bath of molten alkali metal salt for a period of time, said bath being contaminated with Ca$^{2+}$ ions leached out of the glass and/or present as impurities in the salt bath, the improvement which comprises passing water vapor through said bath of molten salt to reduce and/or maintain the amount of Ca$^{2+}$ ions at less than about 1 percent by weight of the molten salt bath.

2. In a method in accordance with claim 1 wherein said glass article consists essentially, by weight on the oxide basis, of about 5–25 percent alkali metal oxide, 5–25 percent by weight Al$_2$O$_3$, and the remainder SiO$_2$.

3. In a method in accordance with claim 2 wherein said alkali metal oxide is Na$_2$O.

4. In a method in accordance with claim 1 wherein an inert gas is utilized as a carrier for said water vapor.

5. In a method in accordance with claim 4 wherein said inert gas is nitrogen.

* * * * *